United States Patent
Etchegoyen

(10) Patent No.: US 9,075,958 B2
(45) Date of Patent: Jul. 7, 2015

(54) USE OF FINGERPRINT WITH AN ON-LINE OR NETWORKED AUCTION

(75) Inventor: Craig Stephen Etchegoyen, Irvine, CA (US)

(73) Assignee: Uniloc Luxembourg S.A., Luxembourg (LU)

( * ) Notice: Subject to any disclaimer, the term of this patent is extended or adjusted under 35 U.S.C. 154(b) by 529 days.

(21) Appl. No.: 12/792,375

(22) Filed: Jun. 2, 2010

(65) Prior Publication Data

US 2010/0332396 A1    Dec. 30, 2010

Related U.S. Application Data

(60) Provisional application No. 61/220,114, filed on Jun. 24, 2009.

(51) Int. Cl.
| | | |
|---|---|---|
| G06F 21/10 | (2013.01) | |
| G06F 21/57 | (2013.01) | |
| G06F 21/73 | (2013.01) | |
| G06Q 30/08 | (2012.01) | |
| H04L 29/06 | (2006.01) | |

(52) U.S. Cl.
CPC ............... *G06F 21/10* (2013.01); *G06F 21/57* (2013.01); *G06F 21/73* (2013.01); *G06Q 30/08* (2013.01); *H04L 63/08* (2013.01); *H04L 63/0876* (2013.01)

(58) Field of Classification Search
USPC ...................................................... 705/37, 64
See application file for complete search history.

(56) References Cited

U.S. PATENT DOCUMENTS

| | | | |
|---|---|---|---|
| 2,320,088 A * | 5/1943 | Leekley | ......................... 524/169 |
| 3,959,884 A * | 6/1976 | Jordan et al. | ..................... 283/69 |
| 4,351,982 A | 9/1982 | Miller et al. | |
| 4,658,093 A | 4/1987 | Hellman | |
| 4,704,610 A | 11/1987 | Smith et al. | |
| 4,796,220 A | 1/1989 | Wolfe | |
| 5,210,795 A | 5/1993 | Lipner et al. | |
| 5,291,598 A | 3/1994 | Grundy | |
| 5,414,269 A | 5/1995 | Takahashi | |
| 5,418,854 A | 5/1995 | Kaufman et al. | |
| 5,440,635 A | 8/1995 | Bellovin et al. | |
| 5,490,216 A | 2/1996 | Richardson, III | |

(Continued)

FOREIGN PATENT DOCUMENTS

| | | |
|---|---|---|
| AU | 678985 | 6/1997 |
| EP | 1637958 | 3/2006 |

(Continued)

OTHER PUBLICATIONS

Lee P, "Oracle Adaptive Access Manager Reference Guide, Release 10g (10.1.4.5)," May 2009, Internet Article retrieved on Sep. 27, 2010. XP002603489.

(Continued)

*Primary Examiner* — Mamon Obeid
(74) *Attorney, Agent, or Firm* — Sean D. Burdick

(57) ABSTRACT

A method for selectively allowing participation in an auction, implemented at one or more servers, includes steps for receiving a request to participate in the auction, receiving machine fingerprint data related to the request to participate in the auction, saving the machine fingerprint data in a memory, comparing the machine fingerprint data with previously stored machine fingerprint data, and determining, using the machine fingerprint data, whether to allow the participation in the auction.

12 Claims, 7 Drawing Sheets

(56) References Cited

U.S. PATENT DOCUMENTS

| | | | |
|---|---|---|---|
| 5,666,415 A | 9/1997 | Kaufman | |
| 5,745,879 A | 4/1998 | Wyman | |
| 5,754,763 A | 5/1998 | Bereiter | |
| 5,790,664 A | 8/1998 | Coley et al. | |
| 5,920,628 A * | 7/1999 | Indeck et al. | 360/25 |
| 5,925,127 A | 7/1999 | Ahmad | |
| 5,974,150 A | 10/1999 | Kaish et al. | |
| 5,974,481 A * | 10/1999 | Broder | 710/49 |
| 6,009,401 A | 12/1999 | Horstmann | |
| 6,026,166 A | 2/2000 | LeBourgeois | |
| 6,044,471 A | 3/2000 | Colvin | |
| 6,148,407 A * | 11/2000 | Aucsmith | 726/16 |
| 6,158,005 A | 12/2000 | Bharathan et al. | |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,294,793 B1 | 9/2001 | Brunfeld et al. | |
| 6,330,670 B1 | 12/2001 | England et al. | |
| 6,449,645 B1 | 9/2002 | Nash | |
| 6,536,005 B1 | 3/2003 | Augarten | |
| 6,671,674 B1 * | 12/2003 | Anderson et al. | 705/26.3 |
| 6,678,823 B1 * | 1/2004 | Fernandez et al. | 713/193 |
| 6,747,564 B1 * | 6/2004 | Mimura et al. | 340/5.52 |
| 6,785,825 B2 | 8/2004 | Colvin | |
| 6,859,793 B1 | 2/2005 | Lambiase | |
| 6,904,472 B2 * | 6/2005 | Barrenscheen et al. | 710/15 |
| 6,910,072 B2 | 6/2005 | Macleod Beck et al. | |
| 6,920,567 B1 | 7/2005 | Doherty et al. | |
| 6,948,064 B2 * | 9/2005 | Smith et al. | 713/168 |
| 6,976,009 B2 | 12/2005 | Tadayon et al. | |
| 7,032,110 B1 | 4/2006 | Su et al. | |
| 7,069,440 B2 | 6/2006 | Aull | |
| 7,069,595 B2 | 6/2006 | Cognigni et al. | |
| 7,080,049 B2 | 7/2006 | Truitt et al. | |
| 7,085,741 B2 | 8/2006 | Lao et al. | |
| 7,089,425 B2 * | 8/2006 | Chan | 713/189 |
| 7,188,241 B2 * | 3/2007 | Cronce et al. | 713/155 |
| 7,203,966 B2 | 4/2007 | Abburi et al. | |
| 7,206,765 B2 | 4/2007 | Gilliam et al. | |
| 7,272,728 B2 | 9/2007 | Pierson et al. | |
| 7,319,987 B1 | 1/2008 | Hoffman et al. | |
| 7,327,280 B2 | 2/2008 | Bachelder et al. | |
| 7,337,147 B2 | 2/2008 | Chen et al. | |
| 7,343,297 B2 | 3/2008 | Bergler et al. | |
| 7,373,506 B2 * | 5/2008 | Asano et al. | 713/168 |
| 7,463,945 B2 * | 12/2008 | Kiesel et al. | 700/174 |
| 7,475,044 B1 * | 1/2009 | Kawai et al. | 705/65 |
| 7,523,860 B2 * | 4/2009 | Bonalle et al. | 235/380 |
| 7,539,869 B1 * | 5/2009 | Mullan et al. | 713/176 |
| 7,650,643 B2 * | 1/2010 | Ishikawa et al. | 726/26 |
| 7,653,899 B1 | 1/2010 | Lindahl et al. | |
| 7,885,899 B1 | 2/2011 | Sancho | |
| 8,131,913 B2 * | 3/2012 | Pyeon | 711/103 |
| 8,145,897 B2 * | 3/2012 | Brickell et al. | 713/155 |
| 8,266,062 B2 * | 9/2012 | Mishra | 705/59 |
| 8,452,974 B2 * | 5/2013 | Sakumoto | 713/180 |
| 8,582,838 B1 * | 11/2013 | McCormick et al. | 382/124 |
| 8,661,252 B2 * | 2/2014 | Chandwani | 713/168 |
| 8,725,645 B1 * | 5/2014 | Montini et al. | 705/52 |
| 8,726,407 B2 * | 5/2014 | Etchegoyen | 726/34 |
| 8,812,854 B2 * | 8/2014 | Shah et al. | 713/176 |
| 8,943,598 B1 * | 1/2015 | Kurian | 726/24 |
| 8,949,609 B2 * | 2/2015 | Teranishi | 713/175 |
| 8,954,729 B2 * | 2/2015 | Terry | 713/155 |
| 8,966,657 B2 * | 2/2015 | Martinez et al. | 726/30 |
| 2001/0034712 A1 | 10/2001 | Colvin | |
| 2001/0044782 A1 | 11/2001 | Hughes et al. | |
| 2002/0019814 A1 | 2/2002 | Ganesan | |
| 2002/0029185 A1 * | 3/2002 | Tanaka et al. | 705/37 |
| 2002/0055906 A1 | 5/2002 | Katz et al. | |
| 2002/0062276 A1 * | 5/2002 | Krueger et al. | 705/37 |
| 2002/0082997 A1 | 6/2002 | Kobata et al. | |
| 2002/0099649 A1 | 7/2002 | Lee et al. | |
| 2002/0161718 A1 | 10/2002 | Coley et al. | |
| 2002/0181747 A1 * | 12/2002 | Topping | 382/124 |
| 2003/0026404 A1 | 2/2003 | Joyce et al. | |
| 2003/0065918 A1 | 4/2003 | Willey | |
| 2003/0074568 A1 * | 4/2003 | Kinsella et al. | 713/186 |
| 2003/0116621 A1 | 6/2003 | Duncan | |
| 2003/0172035 A1 | 9/2003 | Cronce et al. | |
| 2003/0218629 A1 | 11/2003 | Terashima et al. | |
| 2004/0024860 A1 | 2/2004 | Sato et al. | |
| 2004/0030912 A1 | 2/2004 | Merkle et al. | |
| 2004/0059929 A1 | 3/2004 | Rodgers et al. | |
| 2004/0107395 A1 * | 6/2004 | Volkerink et al. | 714/732 |
| 2004/0143746 A1 | 7/2004 | Ligeti et al. | |
| 2004/0187018 A1 | 9/2004 | Owen et al. | |
| 2004/0205015 A1 * | 10/2004 | DeLaCruz | 705/37 |
| 2005/0097366 A1 * | 5/2005 | McCreight et al. | 713/201 |
| 2005/0108173 A1 | 5/2005 | Stefik et al. | |
| 2005/0108177 A1 | 5/2005 | Sancho | |
| 2005/0138155 A1 | 6/2005 | Lewis | |
| 2005/0172280 A1 | 8/2005 | Ziegler et al. | |
| 2005/0268087 A1 * | 12/2005 | Yasuda et al. | 713/2 |
| 2006/0026105 A1 * | 2/2006 | Endoh | 705/59 |
| 2006/0072444 A1 | 4/2006 | Engel et al. | |
| 2006/0095454 A1 | 5/2006 | Shankar et al. | |
| 2006/0161914 A1 | 7/2006 | Morrison et al. | |
| 2006/0222212 A1 * | 10/2006 | Du et al. | 382/115 |
| 2006/0229993 A1 * | 10/2006 | Cole | 705/51 |
| 2006/0265337 A1 | 11/2006 | Wesinger, Jr. | |
| 2006/0282511 A1 | 12/2006 | Takano et al. | |
| 2007/0027792 A1 * | 2/2007 | Smith | 705/37 |
| 2007/0061590 A1 * | 3/2007 | Boye et al. | 713/186 |
| 2007/0110287 A1 * | 5/2007 | Kim et al. | 382/124 |
| 2007/0136792 A1 * | 6/2007 | Ting et al. | 726/5 |
| 2007/0168288 A1 | 7/2007 | Bozeman | |
| 2007/0169181 A1 * | 7/2007 | Roskind | 726/5 |
| 2007/0198422 A1 | 8/2007 | Prahlad et al. | |
| 2007/0203846 A1 | 8/2007 | Kavuri et al. | |
| 2007/0214093 A1 * | 9/2007 | Colella | 705/67 |
| 2007/0219917 A1 | 9/2007 | Liu et al. | |
| 2007/0282615 A1 | 12/2007 | Hamilton et al. | |
| 2008/0065552 A1 | 3/2008 | Elazar et al. | |
| 2008/0086423 A1 | 4/2008 | Waites | |
| 2008/0120195 A1 * | 5/2008 | Shakkarwar | 705/26 |
| 2008/0120229 A1 * | 5/2008 | Patil et al. | 705/39 |
| 2008/0147556 A1 | 6/2008 | Smith et al. | |
| 2008/0183622 A1 * | 7/2008 | Dixon et al. | 705/44 |
| 2008/0226142 A1 * | 9/2008 | Pennella et al. | 382/124 |
| 2008/0228578 A1 | 9/2008 | Mashinsky | |
| 2008/0276321 A1 * | 11/2008 | Svancarek et al. | 726/26 |
| 2008/0320607 A1 | 12/2008 | Richardson | |
| 2009/0083730 A1 | 3/2009 | Richardson | |
| 2009/0119134 A1 * | 5/2009 | Sakaue et al. | 705/4 |
| 2009/0138975 A1 | 5/2009 | Richardson | |
| 2009/0150674 A1 * | 6/2009 | Richardson et al. | 713/171 |
| 2009/0172402 A1 * | 7/2009 | Tran | 713/170 |
| 2009/0178125 A1 * | 7/2009 | Barber et al. | 726/6 |
| 2009/0210932 A1 * | 8/2009 | Balakrishnan et al. | 726/5 |
| 2010/0082973 A1 * | 4/2010 | Brickell et al. | 713/155 |
| 2010/0138663 A1 * | 6/2010 | Silverbrook et al. | 713/179 |
| 2010/0180123 A1 * | 7/2010 | Kopetz | 713/176 |
| 2010/0250949 A1 * | 9/2010 | Torino et al. | 713/176 |
| 2010/0325040 A1 * | 12/2010 | Etchegoyen | 705/39 |
| 2010/0325710 A1 * | 12/2010 | Etchegoyen | 726/7 |
| 2010/0332337 A1 | 12/2010 | Bullock | |
| 2010/0332400 A1 * | 12/2010 | Etchegoyen | 705/75 |
| 2010/0333081 A1 * | 12/2010 | Etchegoyen | 717/172 |
| 2011/0016382 A1 | 1/2011 | Cahill et al. | |
| 2011/0047373 A1 * | 2/2011 | Karasawa et al. | 713/156 |
| 2011/0093503 A1 * | 4/2011 | Etchegoyen | 707/780 |
| 2011/0093703 A1 * | 4/2011 | Etchegoyen | 713/168 |
| 2011/0270694 A1 * | 11/2011 | Halim | 705/18 |
| 2013/0212389 A1 * | 8/2013 | McCreight et al. | 713/168 |

FOREIGN PATENT DOCUMENTS

| | | |
|---|---|---|
| EP | 1637961 | 3/2006 |
| EP | 1670188 | 6/2006 |
| WO | WO 9220022 | 11/1992 |
| WO | WO 9301550 | 1/1993 |
| WO | WO 9535533 | 12/1995 |
| WO | WO 0067095 | 11/2000 |

(56) References Cited

FOREIGN PATENT DOCUMENTS

| WO | WO 2005104686 | 11/2005 |
|---|---|---|
| WO | WO2007060516 | 5/2007 |
| WO | WO2008013504 | 1/2008 |
| WO | WO 2008/127431 | 10/2008 |
| WO | WO2008157639 | 12/2008 |
| WO | WO2009039504 | 3/2009 |
| WO | WO2009065135 | 5/2009 |
| WO | WO2009076232 | 6/2009 |
| WO | WO2009105702 | 8/2009 |
| WO | WO2009143115 | 11/2009 |
| WO | WO 2009158525 | 12/2009 |

OTHER PUBLICATIONS

Smolens et al., "Detecting Emerging Wearout Faults," *In Proceedings of the IEEE Workshop on Silicon Errors in Logic—System Effects*, Apr. 2007, Internet Article retrieved on Sep. 30, 2010. XP002603491.

Wikipedia: "Device Fingerprint," May 5, 2009, modified Jan. 20, 2011, Internet Article retrieved on Apr. 19, 2011.

Wikipedia: "Software Extension," May 28, 2009, Internet Article retrieved on Oct. 11, 2010. XP002604710.

Williams et al., "Web Database Applications with PHP & MySQL," *O'Reilly Media Chapter 1. Database Applications and the Web* Mar. 2002, Internet Article retrieved on Sep. 21, 2010. XP002603488.

Williams, R., "A Painless Guide to CRC Error Detection Algorithms", Ver. 3, Aug. 19, 1993.

Angha, F. et al., "Securing Transportation Network Infrastructure with Patented Technology of Device Locking—Developed by Uniloc USA", avail. at: http://www.dksassociates.com/admin/paperfile/ITS%20World%20Paper%20Submission_Uniloc%20_2_.pdf, Oct. 24, 2006.

Econolite, "Econolite and Uniloc Partner to Bring Unmatched Infrastructure Security to Advanced Traffic Control Networks with Launch of Strongpoint", avail. at: http://www.econolite.com/docs/press/20080304_Econolite_StrongPoint.pdf, Mar. 4, 2008.

Agbinya et al., "Development of Digital Environment Identity (DEITY) System for On-line Access," Third International Conference on Broadband Communications, Information Technology & Biomedical Applications, Third International Conference on IEEE, Piscataway, New Jersey, Nov. 23, 2008, 8 pages. XP031368250.

Salo, Timothy J., "Multi-Factor Fingerprints for Personal Computer Hardware," Military Communications Conference, Piscataway, New Jersey, Oct. 29, 2007, 7 pages. XP031232751.

Guo et al., "Intergrating Web Content Clustering in Web Log Association Rule Mining," *Lecture Notes in Artificial Intelligence 3501*, © Springer-Verlag, Berlin Heidelberg, 2005, pp. 182-193.

Watt, Peggy, "Prolok Signs Up Tandy," InfoWorld Magazine, Mar. 23, 1984, p. 14.

Park et al., "Web Server for Web Page Fingerprinting," Granular Computing, IEEE International Conference on Aug. 26-28, 2008.

\* cited by examiner

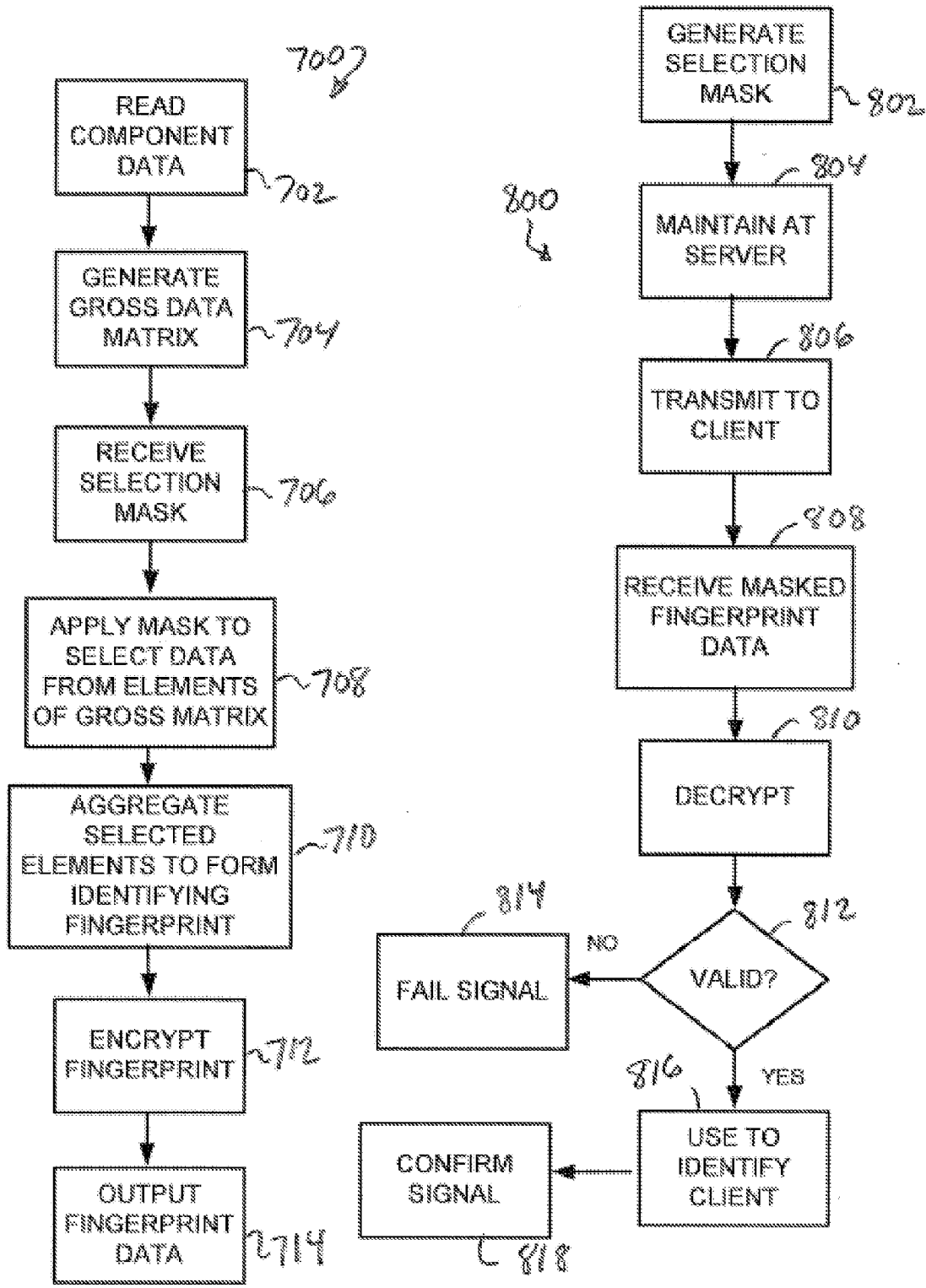
*FIG. 7*                *FIG. 8*

USE OF FINGERPRINT WITH AN ON-LINE OR NETWORKED AUCTION

This application claims priority to U.S. Provisional Application No. 61/220,114 which was filed Jun. 24, 2009 and which is fully incorporated herein by reference.

BACKGROUND

1. Field

The present disclosure relates to methods and systems for selectively allowing or authorizing participation in an auction, and for maintaining and updating a list of known devices that previously have or have not satisfactorily completed one or more steps in previous auction(s).

2. Description of the Related Art

Various on-line or networked auction systems exist for providing auction services. Some auction systems can run on a single server. Such single-server auction systems typically handle smaller demands, including smaller amounts of traffic. To handle larger demands, some auction systems run on several servers to distribute database input/output (I/O) and web transactions. Some auction services offer some form of security by requiring usernames and passwords for access. Some auction services may additionally require credit card information, which may be used as part of access security. Despite the existence of on-line or networked auction services, there remain opportunities to improve such services, including but not limited to improving security by incorporating hardware identification, sometimes called "hardware fingerprinting," and by maintaining a database of prior satisfactory and unsatisfactory completion of auction processes or certain steps in such processes. It is desirable to provide these and other capabilities in a more secure system for on-line or networked auction services.

SUMMARY

The present technology uses a hardware fingerprint in an on-line or networked auction system to increase the security of the system. The system utilizes at least one server in communication with one or more clients via a communications network. For simplicity and illustrative purposes, the following summary will describe a system with only one server, but one of ordinary skill in the art should immediately understand that auction systems using more than one server also are contemplated.

The server responds to data transmitted from a client seeking to participate in an auction, and processes the data to determine whether to authorize or allow participation in the auction. The data from the client includes a hardware fingerprint determined at the client machine. The data from the client may also include credit card information and/or other identifying information. The hardware fingerprint, credit card and/or other identifying information may be registered at the server prior to the auction process.

The hardware fingerprint, with or without other identifying information, may be used to identify to an auction system a particular customer, such as, for example, a prior customer that has successfully completed prior auction processes, or a prior customer that has not successfully completed a prior auction process. Such information may be maintained in database records related to the hardware fingerprint and/or other identifying information accessible to the server(s). The database records may be updated to include, e.g., hardware fingerprints and/or identifying credit card and/or other identifying information and corresponding client names for new users, or new or additional hardware fingerprints and/or identifying credit card and/or other identifying information for prior users. The database records also may be updated to include information indicating whether or not particular hardware fingerprints or identifying credit card or other identifying information or client names are associated with an auction process that has been successfully completed or steps from an auction process that were not successfully completed.

The data transmitted from a client seeking to participate in an auction process, including any hardware fingerprint determined at the client machine and/or any credit card information and/or other identifying information may be encrypted using any suitable encryption technique. Examples of possible encryption techniques include, but are not limited to, a public key algorithm. In one alternative, credit card information and/or other identifying information may be encrypted using a symmetric private key, which may comprise, for example, the hardware fingerprint of the client machine.

A server that has received data transmitted from a client seeking to participate in an auction process will decrypt as necessary the data transmitted from a client using an appropriate decryption technique.

Prior to allowing a particular client to participate in an auction process, a server that has received data transmitted from a client seeking to participate in an auction process processes the data to determine whether to authorize or allow participation in the auction process. The server may compare the hardware fingerprint received from the client with hardware fingerprints already stored in a database or other repository. This repository may simply be a database of hardware fingerprints and associated customer names compiled from prior auction processes.

If the hardware fingerprint received from the client is already stored in a database, the server may prompt the client for confirmation of other information, including identifying credit card or other identifying information or the client name(s) associated with the hardware fingerprint that was received from the client and is already stored in a database.

If the hardware fingerprint received from the client is not already stored in a database, the server may update the database with the new hardware fingerprint data. The server also may prompt the client for additional information, including identifying credit card or other identifying information or the client name(s) associated with the new hardware fingerprint received, and may update the database with the additional information, including the identifying credit card or other identifying information and/or the client name(s) associated with the new hardware fingerprint received.

Prior to allowing a client to complete an auction transaction, the server checks the client's associated hardware fingerprint received from the client and optionally checks other information, including identifying credit card or other identifying information or the client name(s), together with any other related information including historical information, to determine whether any of such information provides an indication that a prior auction process has been satisfactorily completed, or an indication that one or more steps in a prior auction process has not been satisfactorily completed. If such related information provides an indication that a prior auction process has not been sufficiently satisfactorily completed, the transaction requested by the client may not be permitted or completed.

If a particular auction process or transaction is not sufficiently satisfactorily completed, related information, including historical information, in the database may be updated to reflect that the client's associated hardware fingerprint received from the client and optionally other information, including identifying credit card or other identifying information, is associated with an indication that one or more steps in an auction process has not been sufficiently satisfactorily completed.

An indication that an auction process has not been sufficiently satisfactorily completed may comprise information regarding a measure, amount or level of unsatisfactory completion. For example, if a particular auction transaction was initially unsuccessful because a credit card was rejected, but the transaction ultimately was completed with a different credit card, such historical information may reflect a smaller measure, amount or level of unsatisfactory performance that may be tolerable in many typical bidding applications, but perhaps not in certain application, e.g., high value auctions or requests to host an auction where accumulated values of several transactions may be high. If a particular auction transaction was ultimately unsuccessful because of a faulty credit card, or even a client's change of heart, such historical information may reflect a greater measure, amount or level of unsatisfactory performance that may be tolerable in a small number of bidding applications in an auction process. On the other end of the spectrum, if a particular auction transaction ultimately had to be reversed because of unscrupulous or unsavory conduct, such historical information likely reflects a measure, amount or level of unsatisfactory performance that is not tolerable in most auction processes.

The subject technology may further include a novel method and system for determining a hardware fingerprint, which may be used to determine a hardware fingerprint determined for the client in the method and system summarized above. The fingerprinting method is not limited to this application, however, and may be applied to any circumstance in which it is desired to exchange a hardware fingerprint between two machines. The resulting fingerprint has a sufficiently high probability of being unique to the machine from which it is generated. The fingerprint is generated by applying a data template or mask supplied from a server in a fingerprinting operation performed on the client. Without this data template or mask, the fingerprint of the client device is not obtained.

To generate the fingerprint, the client device first reads local system component parameter information according to a predefined algorithm to generate a data file. The parameters checked to generate the fingerprint may include, for example, hard disk volume name, computer name, hard disk initialization date, amount of installed memory, type of processor, software or operating system serial number, or unique parameters associated with firmware installed in the client device. In general, the collected parameter information should be of a time-stable or static nature for the client. The resulting data file, also referred to herein as "gross fingerprint data," may be stored in a file in a memory of the client. It may be advantageous to store the file in a transient file only, such as in a random-access memory (RAM) device, so that no record of the file remains after the fingerprint is generated. The stored data file comprises parameter data arranged in a defined order of data fields or records. Each data field may be of a known length, which may vary for each field. The gross fingerprint data file may be encrypted, secured or obfuscated using any suitable method.

In some embodiments, the client may transmit the entire gross fingerprint data file to a trusted server when it is first generated. In other embodiments, the gross fingerprint data is never provided in its entirety to another device.

The client may then request information from a trusted source for defining a sampling protocol, i.e., the data template or mask, for deriving a working fingerprint from the gross fingerprint data. The sample-defining template may comprise information defining a filter or other transformation to be applied to the original fingerprint data file to generate a device fingerprint. In some embodiments, the template defines a map for selecting designated portions of the fingerprint data file. For example, the template may specify one or more bytes of data, but less than all data, be selected from each data field in a particular order or position. The client processes the gross fingerprint data using the sample-defining template to generate a resulting working machine fingerprint, which may be stored in a local buffering system. The client, the source of the sample-defining template, or both may store the sample-defining information in a secure file for future reference, optionally first encrypting it.

The client may then provide the working machine fingerprint to any other device that needs the fingerprint to identify or authenticate the client device. In some embodiments, a trusted server maintains a record of the entire gross fingerprint data for the client, while the sample-defining template used to generate a working machine fingerprint is discarded after each use. The server may generate the sample-defining template and confirm that the machine fingerprint generated by the client is consistent with both the gross fingerprint data and with the sample-defining template. By specifying different sample-defining templates at different times, the server may thereby authenticate the client without requiring the client to transmit the entirety of the gross fingerprint data for each authentication instance. Instead, the gross fingerprint data may provided from the client to the server during a single initialization session, which may be initiated and secured by the server using appropriate security tools, if it is transmitted at all. Subsequent sessions need not be as secure because the entirety of the gross fingerprint data is not retransmitted. The utility of the client's machine fingerprint for authentication of device identity is thereby maintained in a more secure form.

A more complete understanding of on-line auction system will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

FIG. 7 is a flow chart of one embodiment of the invention showing an illustrative process for generating a fingerprint performed by a client.

FIG. 8 is a flow chart of one embodiment of the invention showing an illustrative process for generating a modular hardware fingerprint performed by a server in cooperation with a client device.

Throughout the several figures and in the specification that follows, like element numerals are used to indicate like elements appearing in one or more of the figures.

DETAILED DESCRIPTION

The present technology offers secure on-line auction services by using machine fingerprint information to perform gate keeping functions. In addition, there are disclosed herein systems and methods for identifying a client computing device for use with the on-line auction services, and in other applications.

Figure 1:
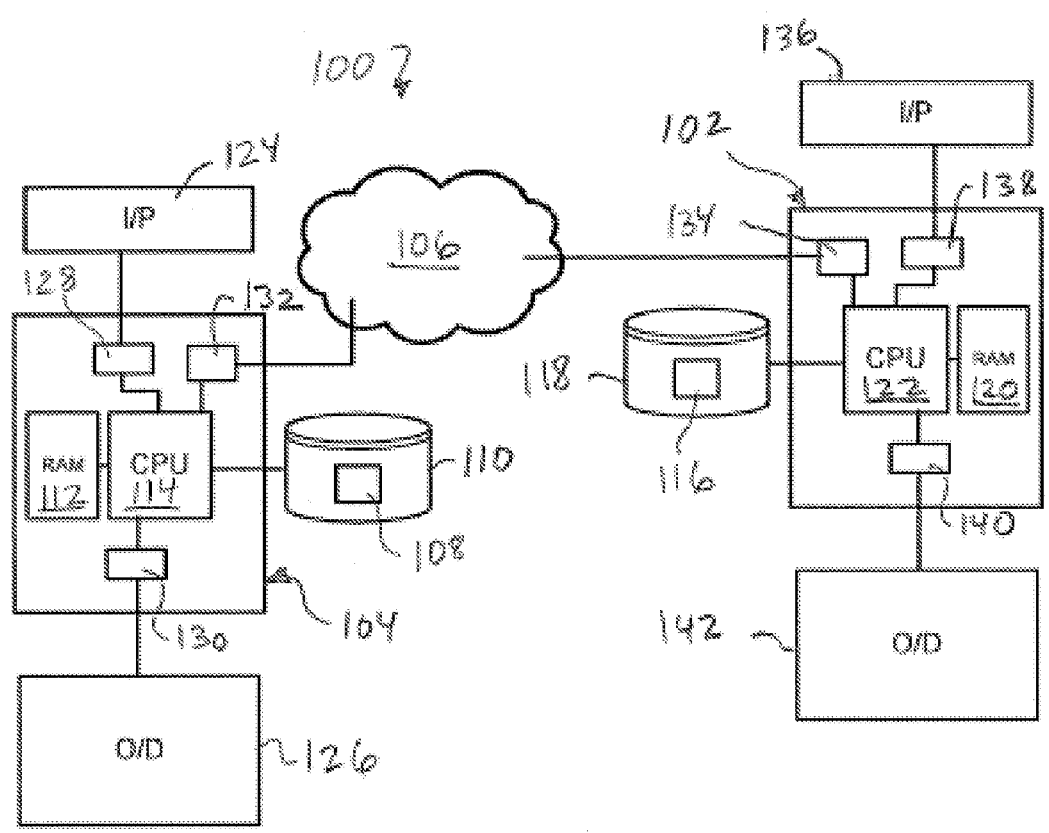
FIG. 1 is a schematic diagram of one embodiment of the invention showing illustrative elements of a system for performing networked auction processes.

FIG. 1 shows a system 100 including a server 102 and a client device 104 in communication via a communications network 106. Communications network 106 may comprise the Internet, a cellular communications network, a satellite communications network, a local area network, or some combination of these or other suitable networks. The client device may be configured with a software executable file or files 108 encoded in a computer-readable media of a data storage device 110. When executed by the client processor 114, the executable file or files causes the client device to perform the client-side processes and outputs as described in more detail herein. Examples of suitable devices for use as client device 104 include personal computers, programmable communications devices such as mobile telephones and media players, "netbooks," and other programmable devices.

Likewise, the server 102 may be configured with a server-side application file or files 116 encoded in a computer-readable media of a data storage device 118. When executed by the server processor 122, the executable file or files causes the client device to perform the server-side processes and outputs as described in more detail herein. File or files 108 and 116 may be developed by writing programming code in any suitable programming language to perform the actions and provide the outputs consistent with the disclosure herein, and compiling the code to provide machine-executable code. Like the client device 104, the server 102 may comprise any one of various suitable programmable computing devices. In the alternative, server 102 may comprise a coordinated assembly of such computing devices, for example, a server farm or cluster, or a distributed network of servers.

Generally, both the server 102 and the client 104 may be configured as input-transforming machines, the very purpose of which is to receive physical input from at least one client-side user input device 124 and provide a responsive physical output via a client-side output device 126, such as an audio-video output. Input device 124 may comprise various devices, for example, a keyboard, mouse, microphone, or other physical transducer connected to client 104 and configured to transform physical input from a user into a data signal, which may be routed through an interface device 128 and provided as input to processor 114. The processor 114, operating an executable as described herein, responds to the input signal and provides output data through a video interface 130 to an output device 126. The processor 114 may further receive input data from the server 102 or provide output to the server via network interface 132 and communications network 106.

Conversely, server 102 may receive input data from the client 104 or provide output to the client via network interface 134 and communications network 106. Optionally, server 102 may comprise an input device 136 in communication with the processor 120 via an interface 138, and provide output via an interface 140 to an output device 142, such as an audio or video output device.

Figure 2:
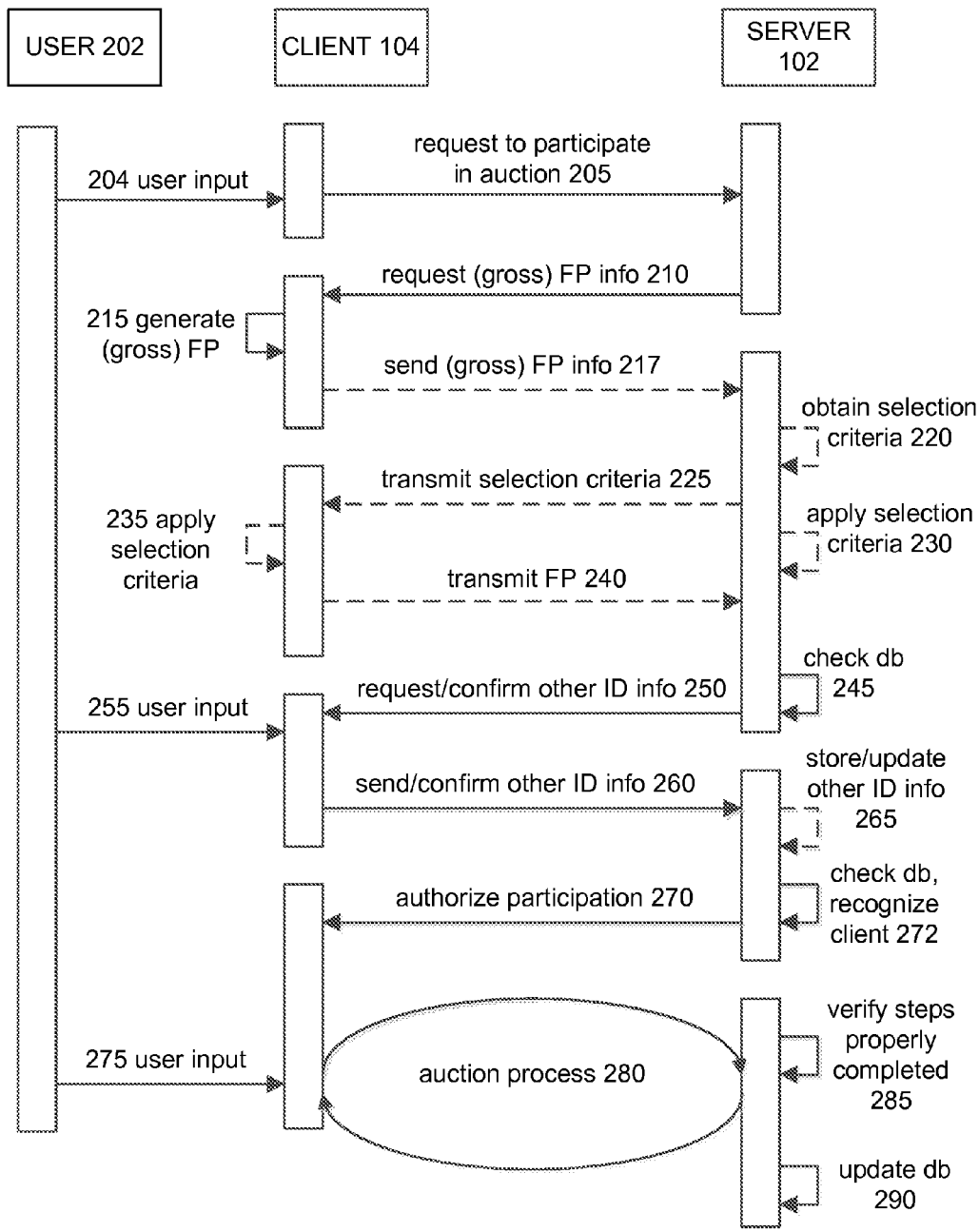
FIG. 2 is a sequence diagram of one embodiment of the invention showing illustrative process elements for networked auction processes across different system components.

FIG. 2 is illustrative of some responsive and independent actions of a client 104 operating in cooperation with a server 102 to receive input from a user 202 and provide responsive output to the user. By way of background, a software executable installed, or to be installed, on client 104 is capable of performing functions desired by the user. The software executable may be installed by copying to the client from, e.g., a portable computer-readable media read by a client component, or a peripheral device in communication with the client, or a remote source via a communications network.

Client 104 may receive user input (204) and thereby generate a request (205) to the server 102. The user input and request may communicate a user's interest in participating in an auction process, e.g., bidding on an item, offering an item for sale via an auction, hosting an auction, or returning to complete an uncompleted transaction or rectify a failed prior transaction. In response to the request, the server 102 may initiate a request (210) for identifying data or machine fingerprint data at the client device. The fingerprinting function(s) may be performed by one or more separate applications, for example, one or more distributable applications pushed to the client 104 by server 102 in connection with the request for identifying information, or at some earlier time.

Methods for generating a gross machine fingerprint are described later in the specification. "Gross" is used with "fingerprint" herein to signify a set of identification data from which a smaller set of data may be extracted to provide a selected set of fingerprint data. "Fingerprint data" is described more detail below, and signifies data that is characteristic of hardware or firmware belonging to the client device, collected and assembled to have a sufficiently high probability, depending upon the use and environment, of being unique to the client.

The request from the server 210 optionally may include specific selection criteria to extract only a subset of the fingerprint data. In response to the request for the server 102, the client 104 may generate fingerprint data or gross finger print data (215). The client may maintain the gross fingerprint data in a temporary memory or client buffer, as a temporary file having a defined data structure. In the alternative, or in addition, the client may store the gross fingerprint data in a memory storage device or transmit it to the server (217). Either of these alternatives, however, may increase the risk of the gross fingerprint data being taken and used to circumvent the protective measures disclosed herein. Conversely, such risks may be reduced by encrypting, obfuscated or otherwise securing the gross fingerprint data using any suitable method.

Optionally, if not part of the original request for fingerprint data, the server 102 may generate or obtain from memory suitable selection criteria (220). These selection criteria may also be referred to as a "mask" or "template". The server may retrieve a stored selection mask having parameters defined for gross fingerprint data having a predetermined data structure. In the alternative, or in addition, the server may generate a selection mask in response to receiving data describing the data structure of the gross fingerprint. A key characteristic of the selection mask is a designation of less than 100% of the data contained in the gross fingerprint file, for example, 5%, 10%, or some other percentage within the range of about 0.1% to 99%, and more typically about 5% to 50%. The selection mask also defines locations within the gross fingerprint file from which the designation portion of selected data is to be selected. For example, the selection mask may specify selecting the first and third data bytes from a first field of the data structure, the third and fourth bytes from the second field, and so forth. Further details and examples of selection masks are described later in the specification.

Optionally, the server 102 may apply the selection criteria to the gross fingerprint data if maintained at the server (230), or supply the selection criteria to the client 104 if not previously done (225), in which case the selection criteria or mask is applied (235) at the client 104.

The mask is applied to the gross fingerprint data to generate a selected machine fingerprint. The machine fingerprint may be determined by an irreversible function of the gross fingerprint data and the selection mask, such that the selection mask and machine fingerprint cannot be used to determine the gross machine fingerprint. The irreversible function comprises selecting data from the gross fingerprint data as specified by the selection criteria to create a second fingerprint file from which a substantial portion of the gross fingerprint data is omitted. The irreversible function may further comprise encrypting the second file using an irreversible cryptographic hash.

If the mask is applied by the client 104, the fingerprint is transmitted (240) to the server 102. Optionally, the client 104 may encrypt the one or more files before transmitting to the server 102. After transmitting the machine fingerprint, the client 102 may delete the gross fingerprint data and/or the machine fingerprint from any local memory. In the alternative, the client may store the gross fingerprint data and/or the machine fingerprint in a local non-volatile memory or storage device accessible to the client.

If the masking is performed by the client, the server 102 receives the machine fingerprint and decrypts it if necessary. The masked fingerprint data may be stored in a local or remote memory accessible to the server.

After obtaining the masked fingerprint data, the server 102 compares the data with one or more local or remote databases of previously received or registered fingerprint data (245).

If the fingerprint data of the client 104 is found in a database, the server may determine whether additional user data such as user name, address, phone number, and credit card or other payment information is already on file.

If such additional user data is found, the server may request confirmation of such additional user data (250), and permit updating of such data by the user 202 if necessary.

If the fingerprint data of the client 104 is not found in a database, or if such additional user data is not on file, the server may request such additional user data (250), e.g., user name, address, phone number, and credit card or other payment information.

Depending on the request (250) from the server 102, the user 202 may provide confirmation or input all the necessary user data (255) to the client 104, which receives the confirmation or user data and transmits the confirmation or data (260) to the server 102. Optionally, the user data may be encrypted by the client 104 before transmission to the server 102 using any suitable encryption technique.

The server 102 optionally may store locally or remotely the user data (265).

Optionally, the server 102 may check the local and/or remote databases to determine if there is any historical information indicating that the client 104 previously did not successfully complete one or more steps in an auction process. If the optional check determines that the client 104 previously did not successfully complete one or more steps in an auction process, the server may initiate appropriate and suitable measures, including seeking pre-payment for services to be rendered, or terminating the session until appropriate corrective action is taken by the user 202. This check may be performed when fingerprint data is first received, or at any time thereafter, and may or may not include the additional user data.

After the server 102 has obtained the masked machine fingerprint and user data and performed any necessary verifications, the server 102 may authorize (270) the client 104 and/or user 202 to participate in the requested auction process. The authorization may include a request for additional data, such as any requirements or restrictions regarding the subject matter the user may seek to purchase or sell, any price requirement(s), any temporal requirement(s) in connection with any sale(s) or purchase(s), and/or any requirement(s) regarding potential sellers or buyers. The request(s) for additional data may be made and the corresponding response(s) may be gathered using any suitable technique(s).

The user 202 may then elect to participate in a selected auction process via user input (275) to, e.g., bid on one more items offered in an on-line or networked auction or offer one or more items for other users (not shown) to bid on. The selected auction process also could encompass returning to complete a previously uncompleted transaction, or to ameliorate a failed transaction. The user input 275 is transmitted to the server as part of the auction process (280), which may be any suitable on-line or networked auction function or service.

Optionally, the server 102 may perform a check after each step or certain steps to determine whether the user 202 is properly completing the step. If any steps are not properly completed, a local or remote database containing historical information indicating whether clients (not shown) previously did or did not successfully complete one or more steps in an auction process may be updated (290) to reflect that one or more steps in the auction process (280) was not properly completed by user 202 or client 104. The historical information update may include the masked machine fingerprint corresponding to client 104, and any other suitable user data corresponding to user 202. If not updated earlier, at the end of the auction process (280), the local or remote database containing historical information indicating whether clients previously did or did not successfully complete one or more steps in an auction process optionally may be updated (290) to reflect whether the auction process (280) was properly completed.

Optionally, the historical update may include information regarding a measure, amount or level of unsatisfactory completion, which may also be thought of or referred to as a "reputation level". For example, if a user 202 initially failed to complete a purchase because a credit card was rejected, but the transaction ultimately was completed by the user 202 (e.g., using a different credit card or rectifying any problems with the credit card company), the historical update information may reflect a smaller measure, amount or level of unsatisfactory performance that may be tolerable in many typical bidding applications, but perhaps not in certain application, e.g., high value auctions or requests to host an auction where accumulated values of several transactions may be high.

If a user 202 ultimately failed to complete a transaction because of various reasons, such as, for example, credit card problems, or merely a change of heart, the historical update information may reflect a greater (e.g., moderate) measure, amount or level of unsatisfactory performance that may be tolerable in a small number of bidding applications in an auction process where the items being auctioned are of relatively smaller value, but may not be tolerable in many other auction processes.

On the other end of the spectrum, if a particular auction transaction ultimately had to be reversed because of unscrupulous, fraudulent or otherwise unsavory conduct by a user 202, the historical update information may reflect a (high)

measure, amount or level of unsatisfactory performance that is not tolerable in most auction processes.

The above-described historical "reputation levels" may be stored in any fashion that permits suitable categorization. For example, the above illustrative examples of small, moderate and intolerable risk levels could be quantized and represented with decimal "reputation level" values of 1, 2, and 3, respectively. The decimal values may be represented in any format, e.g., a binary number format. Using this illustrative categorization, increasing "reputation levels" represent increasing risk that a transaction may not be satisfactorily completed. Any other suitable reputation level categorization may be used, and need not use quantization, but instead a more complicated formulaic approach.

Figure 3:
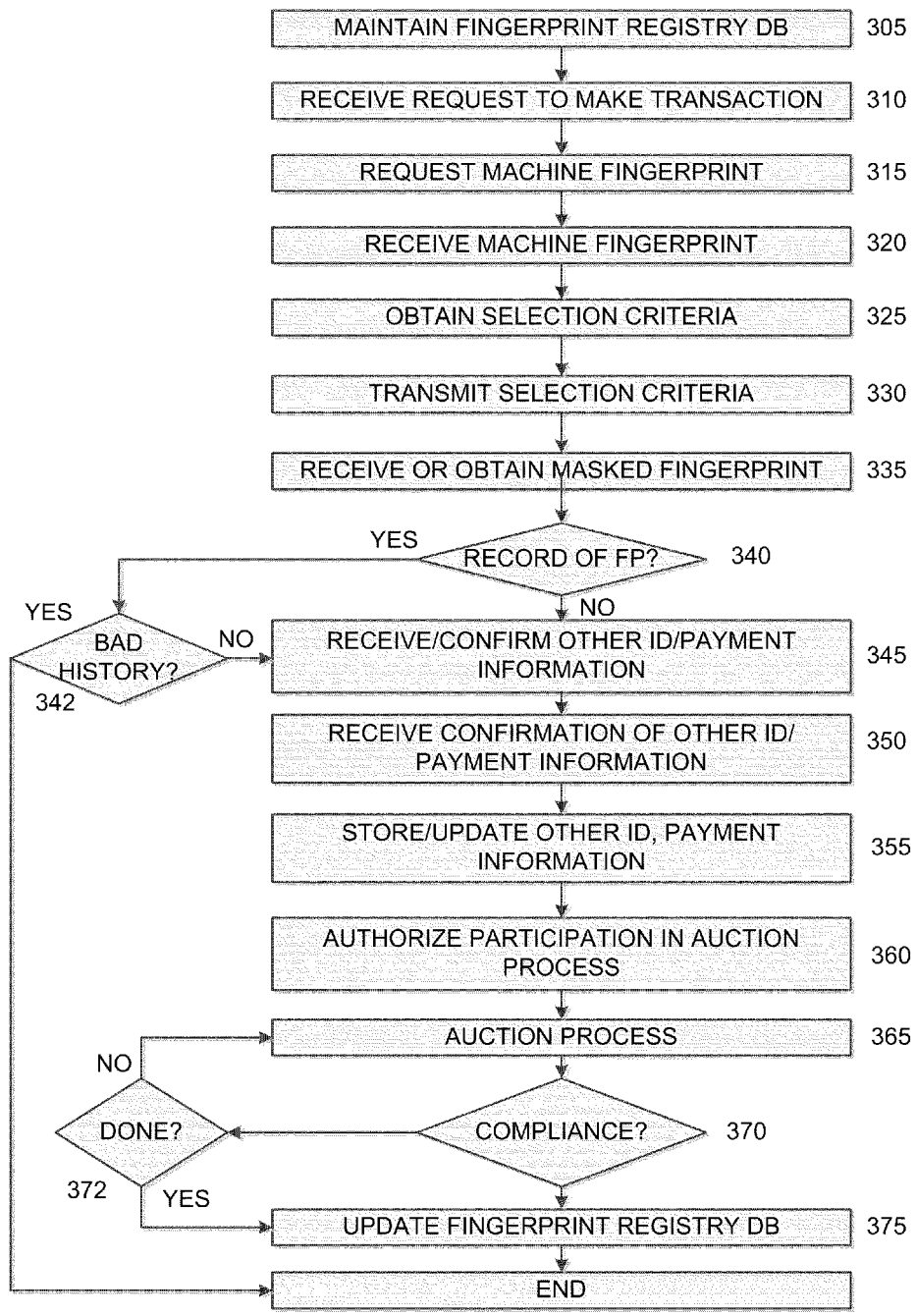
FIG. 3 is a flow chart of one embodiment of the invention showing illustrative auction processing steps performed by a server.
Figure 4:
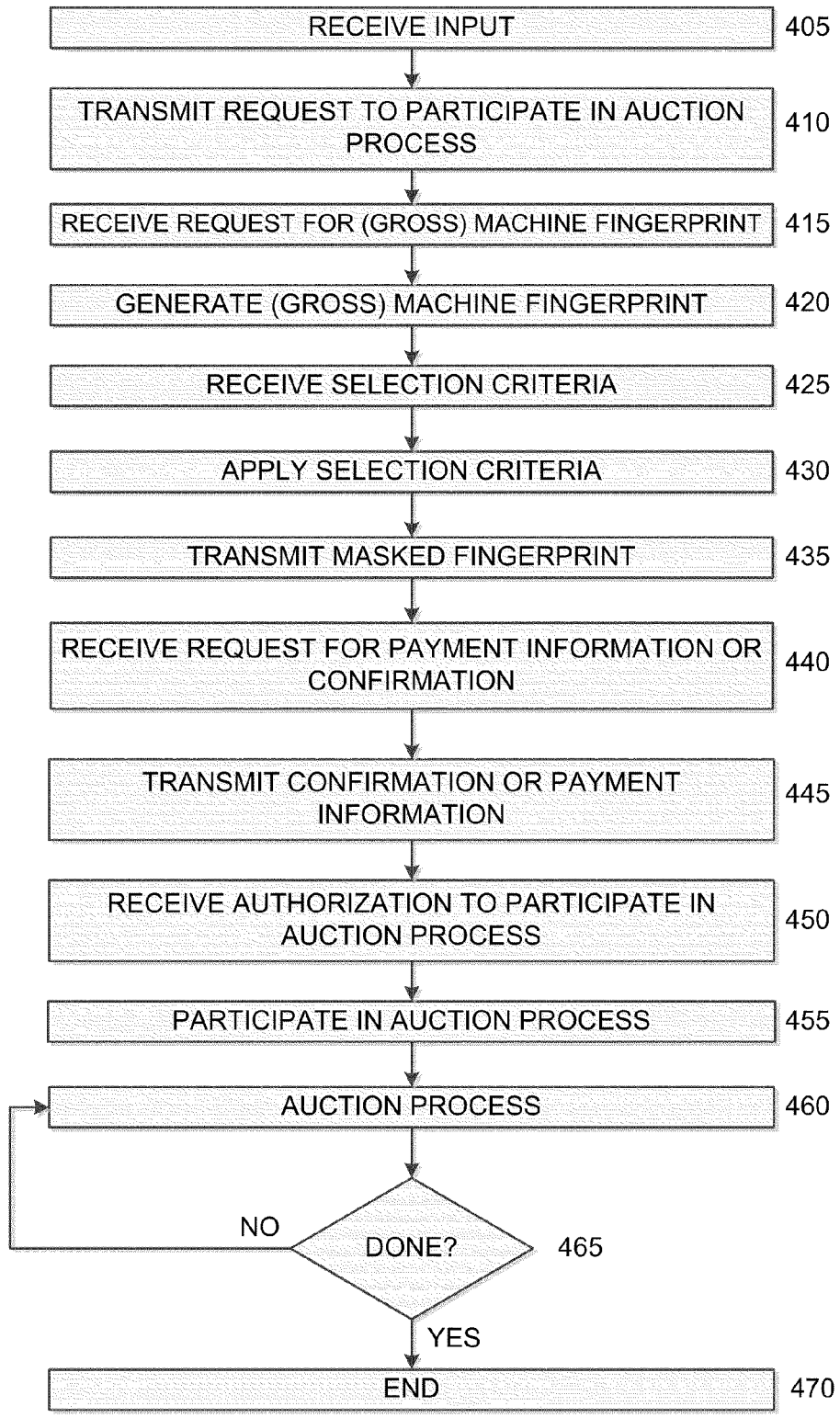
FIG. 4 is a flow chart of one embodiment of the invention showing illustrative auction processing steps performed by a client.

FIG. 2 diagrams the interaction between a server (or multiple servers), client, and user. FIG. 3 shows how a server (or multiple servers) performs methods consistent with the descriptions herein, including interactions illustrated in FIG. 2 and corresponding text. FIG. 4 shows how a client performs methods consistent with descriptions herein, including the interactions illustrated in FIG. 2 and corresponding text.

Referring to FIG. 3, a method 300 is shown for implementation on one or more servers. The server(s) may maintain a machine fingerprint registry 305, databases or a database accessible to the server and responsive to input and queries from the server.

The fingerprint registry 305 may hold machine fingerprint records in association with users or other corresponding identifying information, including, e.g., credit card information. The fingerprint registry functions as a means for identifying users. This registry merely exemplifies a useful data structure for use with the disclosed method, and other means for registering or tracking the information discussed above may also be useful.

With these registries or equivalent functional capacity in place, the server may receive a request to participate in an auction process 310. The processor and network interface, programmed using one or more suitable applications to communicate data over the network and recognize such a request, may comprise a means for receiving such a request.

In response to the request, the server may request machine fingerprint data 315 from the client device. Alternatively, the server may request that the fingerprint data merely be gathered by the client but not sent to the server. The request for fingerprint data may include pushing one or more distributable applications to the client in connection with the request for identifying information, if such has not been done at an earlier time. The processor and network interface, programmed using one or more suitable applications to communicate data over the network and transmit such a request, may comprise a means for transmitting such a request.

Following a request for machine fingerprint data 315, the server may then receive gross fingerprint data 320 transmitted by the client. Alternatively, server may not receive fingerprint data until the client has applied the mask to the fingerprint data.

The server may obtain selection criteria 325. The server may do so from a local or remote memory location, or from a formulaic determination, in which the processor is programmed with a suitable algorithm to select particular portions of the gross fingerprint. The request 315 may include selection criteria or mask.

The server may then transmit the selection criteria or mask to the client 330. This will permit the client to generate the masked fingerprint data. Alternatively, the server may transmit the mask together with the request 315. Alternatively, the server may not transmit the mask at all, if the mask is to be applied at the server.

At step 335, the server receives the masked fingerprint sent by the client. Alternatively, the server may obtain the (masked) fingerprint data by applying the mask to gross machine fingerprint data that may have been received in step 320.

At step 340, the server may check the local or remote database(s) with previously stored masked fingerprints corresponding to known users or prior uses. The comparison of the masked fingerprint data may be accomplished using any suitable method, one of which is to compare the received or obtained masked fingerprint data with the fingerprint data from the registry. In an alternative, an algorithm programmed in software running on the server may test whether the fingerprint complies with required data characteristics of a fingerprint, without reference to a database. A processor programmed to query a database and compare query results or otherwise process machine fingerprint data to check validity may comprise a means for verifying validity of the machine fingerprint.

Optionally, as part of step 340 or another step (e.g., 342), the server may check the local and/or remote databases to determine if there is any historical information indicating that the client previously did not successfully complete one or more steps in an auction process. If the optional check determines that the client previously did not successfully complete one or more steps in an auction process, the server may initiate appropriate and suitable measures, including seeking pre-payment for services to be rendered, or terminating the session until appropriate corrective action is taken by the user. This check may be performed when fingerprint data is first received, or at any time thereafter, and may or may not include the additional user data.

At step 345, if the server cannot validate the fingerprint data received or obtained, the server may generate and transmit a request for other identification information, including, e.g., user name, address, phone number, and credit card or other payment information. Alternatively, if the server can validate the fingerprint data received or obtained, the server may seek to confirm that other identification information in the database associated with the fingerprint information is correct, including, e.g., user name, address, phone number, and credit card or other payment information.

At step 350, the server receives additional identification information, including, e.g., user name, address, phone number, and credit card or other payment information, or receives confirmation that the information it has on record associated with the subject fingerprint data is correct.

At step 355, the server updates local and/or remote database(s) with new or updated additional identification information, including, e.g., user name, address, phone number, and credit card or other payment information, associated with the fingerprint information.

At step 360, if there is no historical information indicating prior failures to complete transactions, the server transmits an authorization or authorizes the requested auction process, or the requested participation in the auction process. The authorization may include providing a password or other security information that is to be used by a client to participate in the auction process.

365 represents the server's auction processing steps, which encompasses any suitable on-line or networked auction functions or services provided by the server.

At 370, the server may perform a check after each step or certain steps to determine whether a particular step has been properly completed and that requirements are complied with. If any steps are not properly completed, a local or remote database containing historical information indicating whether clients previously did or did not successfully complete one or more steps in an auction process may be updated (375) to reflect that one or more steps in the auction process was not properly completed. The historical information update may include the masked machine fingerprint obtained in step 335 corresponding to the client and its user that have a compliance failure, and any other suitable user data corresponding to that user.

As discussed previously, optionally, the historical update (375) may include information regarding a measure, amount or level of unsatisfactory completion, or a user "reputation level". For example, if a user initially failed to complete a purchase because a credit card was rejected, the historical update information may initially reflect a larger amount of or level of unsatisfactory performance. If the user returns and ultimately completes the transaction, any unfavorable information included in the reputation level may be cleared, or, alternatively, the historical update may reflect both the initial failure and the subsequent amelioration with a smaller measure, amount or level of unsatisfactory performance that may be tolerable in many typical bidding applications, but perhaps not in certain applications, e.g., high value auctions or requests to host an auction where accumulated values of several transactions may be high.

Additionally, as discussed earlier, if a particular auction transaction ultimately had to be reversed because of unscrupulous, fraudulent or otherwise unsavory conduct by a user, the historical update information may reflect a (high) measure, amount or level of unsatisfactory performance (and corresponding reputation level) that is not tolerable in most auction processes. As discussed earlier, any suitable reputation level categorization may be used.

If not updated earlier, when the server determines that the auction process is completed (372), the local or remote database(s) containing historical information indicating whether clients previously did or did not successfully complete one or more steps in an auction process optionally may be updated (375) to reflect whether or not the masked fingerprint data obtained in step 335 is associated with satisfactory completion of the server's auction process (365). The historical update may reflect both favorable and unfavorable changes in a particular user's profile.

So far as the server is concerned, the machine fingerprint may comprise any data that uniquely identifies the client machine as a physical unit, and not merely as holding some identification data previously supplied by the server to the client. In other words, the machine fingerprint should not be confused with a cookie identifier, which comprises data originating from a server and stored on the client. In some embodiments, the machine fingerprint is developed by interaction between the server and the client, as described more fully in connection with FIGS. 5-8 below. In other embodiments, the fingerprint may be independently generated at the client by operation of the software executable to which the license key is assigned. The processor and network interface, programmed using one or more applications to communicate data over the network and recognize a machine fingerprint, may comprise a means for receiving the fingerprint data.

FIG. 4 shows a method 400 for implementation on a client, for use in cooperation with server-based method 300.

At 405, the client receives input seeking to participate in an auction process. The input could be generated by a user with an input device, or could be an automated input from an executable application resident on the client or remotely.

At 410, the received request to participate in an auction process is transmitted. A network interface, optionally together with a processor, programmed using one or more suitable applications to communicate data over the network and transmit such a request, may comprise a means for transmitting such a request.

At 415, the client receives a request for gross machine fingerprint information. Optionally, the request received could also be coupled with selection criteria (e.g., a mask), which case the received request could be for masked fingerprint data. A network interface, optionally together with a processor, programmed using one or more suitable applications to communicate data over the network and recognize such a request, may comprise a means for receiving such a request.

At 420, the client generates the requested fingerprint information. At least one application running on the client computing device or otherwise accessing the computing device's hardware and file system may generate a machine fingerprint. The application may prepare a gross fingerprint and select from a portion of that machine fingerprint for providing to the server. In the alternative, the client may prepare a gross fingerprint for use in its entirety as a machine fingerprint for providing to the server. In either case, the application may generate the gross fingerprint data using a process that operates on data indicative of the client's configuration and hardware. The gross fingerprint data may be generated using user-configurable machine parameters, non-user-configurable machine parameters, or both, as input to a process that generates a gross fingerprint data file as binary data.

Each machine parameter indicates a state or identifier for a hardware component, software component, or data component of the client. To obtain stable gross fingerprint data, relatively stable or static machine parameters should be selected. The machine parameters may be selected such that the resulting gross fingerprint data has a very high probability (e.g., greater than 99.999%) of being unique to the client. In addition, the machine parameters may be selected such that the gross fingerprint data includes at least a stable unique portion up to and including the entire identifier that has a very high probability of remaining unchanged during normal operation of the client. The resulting gross fingerprint data should be highly specific, unique, reproducible and stable as a result of properly selecting the machine parameters.

Figure 5:
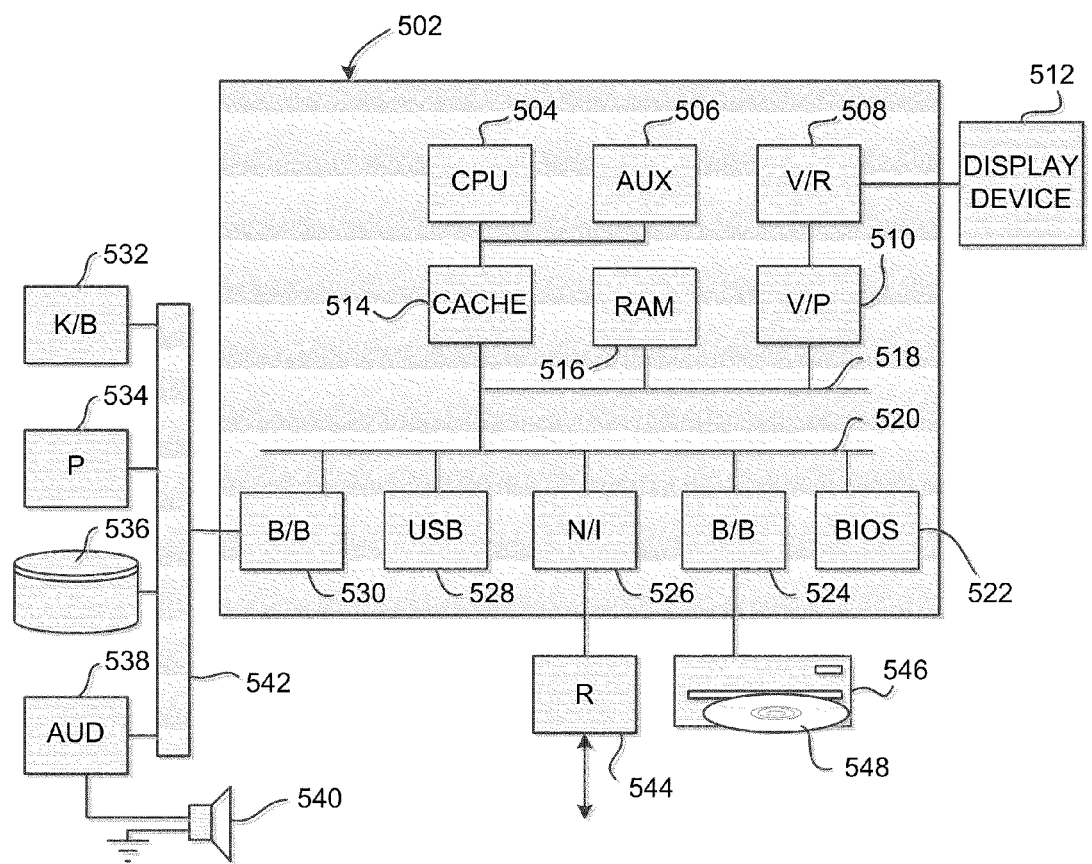
FIG. 5 is a system diagram of one embodiment of the invention showing illustrative elements of a client and its components for generating a fingerprint.

An example of a client device 500 comprising multiple components that may provide input for a gross fingerprint is shown in FIG. 5. Client 500 is depicted by way of example only, and does not limit the configuration of a client device on which hardware fingerprinting may usefully be performed. Client 500 may comprise a motherboard 502 on which reside a CPU 504 and one or more auxiliary processors 506. The CPU may comprise a cache memory 514 in communication with a random access memory (RAM) 516. A video processor 510 may communicate with these components via a bus or hub 518, including, e.g., a Northbridge hub, and provide video data through video RAM 508 to a display device 512.

Other components may communicate with the CPU 504 via a bus or hub 520, including, e.g., a Southbridge hub, such as, for example a BIOS read-only memory or flash memory device 522, one or more additional bus bridges 524, 530, a network interface device 526, and a serial port 528. Each of these and other components may be characterized by some data or parameter settings that may be collected using the CPU 504 and used to characterize the client device 500. In addition, the client may be connected to various peripheral devices. For example, client 500 may be connected to a keyboard 532, a pointing device 534, a data storage device 536, and an audio output device 538 for transforming a data signal into audio output for a speaker 540 or amplifier (not shown). Other peripheral devices may include a router 544 connected via network interface 526 and providing connectivity to the Internet or other network, which may comprise a means for receiving applications or data from a server, or communicating with a server. Some clients may also include a media reader 546 for portable media 548, which may comprise a means for receiving an application capable of performing methods and processes disclosed herein.

Although client device 500 is shown with components as may often be found in personal computers, the technology disclosed herein may also be implemented on more highly integrated portable clients having programmable processors, memories and means for communicating with a server. Such clients also have components with non-user-configurable settings that may be used in compiling a device fingerprint. Examples of integrated portable clients include application-capable mobile phones, media players, personal organizers, and netbooks.

Returning to FIG. 4, to generate the fingerprint 420, the application may operate by performing a system scan to determine a present configuration of the computing device. The application may then select the machine parameters to be used as input for generating the unique gross fingerprint data. Selection of parameters may vary depending on the system configuration. Once the parameters are selected, the application may generate the identifier.

Illustrative examples of various machine parameters that may be accessible to an application or applications running on or interacting with a processor of the client machine include: machine model; machine serial number; machine copyright; machine ROM version; machine bus speed; machine details; machine manufacturer; machine ROM release date; machine ROM size; machine UUID; and machine service tag. For further example, these machine parameters may include: CPU ID; CPU model; CPU details; CPU actual speed; CPU family; CPU manufacturer; CPU voltage; and CPU external clock; memory model; memory slots; memory total; and memory details; video card or component model; video card or component details; display model; display details; audio model; and audio details; network model; network address; Bluetooth address; BlackBox model; BlackBox serial; BlackBox details; BlackBox damage map; BlackBox volume name; NetStore details; and NetStore volume name; optical drive model; optical drive serial; optical details; keyboard model; keyboard details; mouse model; mouse details; printer details; and scanner details; baseboard manufacturer; baseboard product name; baseboard version; baseboard serial number; and baseboard asset tag; chassis manufacturer; chassis type; chassis version; and chassis serial number; IDE controller; SATA controller; RAID controller; and SCSI controller; port connector designator; port connector type; port connector port type; and system slot type; cache level; cache size; cache max size; cache SRAM type; and cache error correction type; fan; PCMCIA; modem; portable battery; tape drive; USB controller; and USB hub; device model; device model IMEI; device model IMSI; and device model LCD; wireless 802.11 device; webcam; game controller; silicone serial; and PCI controller; machine model, processor model, processor details, processor speed, memory model, memory total, network model of each Ethernet interface, network MAC address of each Ethernet interface, BlackBox Model, BlackBox Serial (e.g., using Dallas Silicone Serial DS-2401 chipset or the like), OS install date, nonce value, and nonce time of day. The foregoing examples are merely illustrative, and any suitable machine parameters may be used.

Because many client devices are mass-produced, using hardware parameters limited to the client box may not always provide the desired level of assurance that a gross fingerprint is unique to the client device. Use of user-configurable parameters may ameliorate this risk considerably, but at the cost of less stability. In addition, sampling of physical, non-user configurable properties for use as parameter input may also lessen the risk of generating duplicate fingerprint data. Physical device parameters available for sampling may include, for example, unique manufacturer characteristics, carbon and silicone degradation and small device failures.

Measuring carbon and silicone degradation may be accomplished, for example, by measuring a processor chip's performance in processing complex mathematical computations, or its speed in response to intensive time variable computations. These measurements depend in part on the speed with which electricity travels through the semi-conductor material from which the processor is fabricated. Using variable offsets to compensate for factors such as heat and additional stresses placed on a chip during the sampling process may allow measurements at different times to reproduce the expected values within a designated degree of precision. Over the lifetime of the processor, however, such measurements may change due to gradual degradation of the semi-conductor material. Recalibration or rewriting the gross fingerprint data may be used to compensate for such changes.

In addition to the chip benchmarking and degradation measurements, the process for generating a gross fingerprint data may include measuring physical, non-user-configurable characteristics of disk drives and solid state memory devices. For example, each data storage device may have damaged or unusable data sectors that are specific to each physical unit. A damaged or unusable sector generally remains so, and therefore a map of damaged sectors at a particular point in time may be used to identify a specific hardware device later in time. Data of this nature may also be included in a gross fingerprint file.

The application may read parameters from operating system data files or other data stored on the client, or actively obtain the parameters by querying one of more hardware components in communication with a processor on which the application is operating. A client processor provided with at least one application operating in this fashion of gather the machine parameters may comprise a means for collecting and generating gross fingerprint data.

This process of generating a working machine fingerprint 420 may include at least one irreversible transformation, such as, for example, a cryptographic hash function, such that the input machine parameters cannot be derived from the resulting gross fingerprint data. Each gross fingerprint data, to a very high degree of certainty, cannot be generated except by the suitably configured application operating or otherwise having had access to the same computing device for which the gross fingerprint data was first generated. Conversely, each gross fingerprint, again to a very high degree of certainty, can be successfully reproduced by the suitably configured application operating or otherwise having access to the same computing device on which the identifier was first generated.

Optionally, the client device may store the fingerprint in a local memory. However, in some embodiments the fingerprint is stored by the client device only temporarily to facilitate transmission to the server. This approach may lessen the risk of the fingerprint data being discovered and used for an unauthorized purpose. Alternatively, the client may transmit the gross fingerprint.

At 425, the client may receive selection criteria (e.g., a masking algorithm). At 430, the client may implement a pattern masking algorithm as described elsewhere in the specification, so that only a portion of the fingerprint data will be transmitted. This may reduce the risk that fingerprint data will be somehow intercepted during or after transmission, and used for some unauthorized purpose.

At 435, the client device may transmit the masked fingerprint as previously described. If the client does not receive any further request information or authorization to participate in an auction process (or a failure message) within a reasonable period of time (for example, 60 seconds), this may indicate a failure in communication, causing the client to transmit 435 the masked fingerprint a second time. If the masking is performed remotely, the client may not perform steps 425, 430 or 435.

At 440, the client may receive a request for confirmation that additional user data, e.g., user name, address, phone number, and credit card or other payment information is correct, or, if not already on file, a request for such additional user data. Depending on the request, the user may provide confirmation or input all the necessary user data to the client, or the client may retrieve such information from local or remote memory. Depending upon the request 440 received, at 445, the client transmits a confirmation or the requested additional user data. Optionally, before transmitting additional user information, including any payment information, the client may encrypt the additional user data using any suitable encryption technique.

At 450, the client receives authorization to participate in an auction process. The authorization may include a password or other security information that is to be used to participate in the auction process.

Block 460 represents the client's auction processing steps, which encompasses any suitable on-line or networked auction function that is executed by the client. The functions might include, but are not limited to, bidding on an item offered for sale via an auction process, offering an item for sale via an auction, hosting an auction, or returning to complete an uncompleted transaction, or rectify a failed prior transaction.

At 465, the client checks whether the auction process is complete. This check might be performed periodically, or after every auction step performed by the client in 460. If the auction process is not complete, the auction process continues. Once the auction process is complete, the client may exit the application, and, optionally, terminate any network connections.

Figure 6:
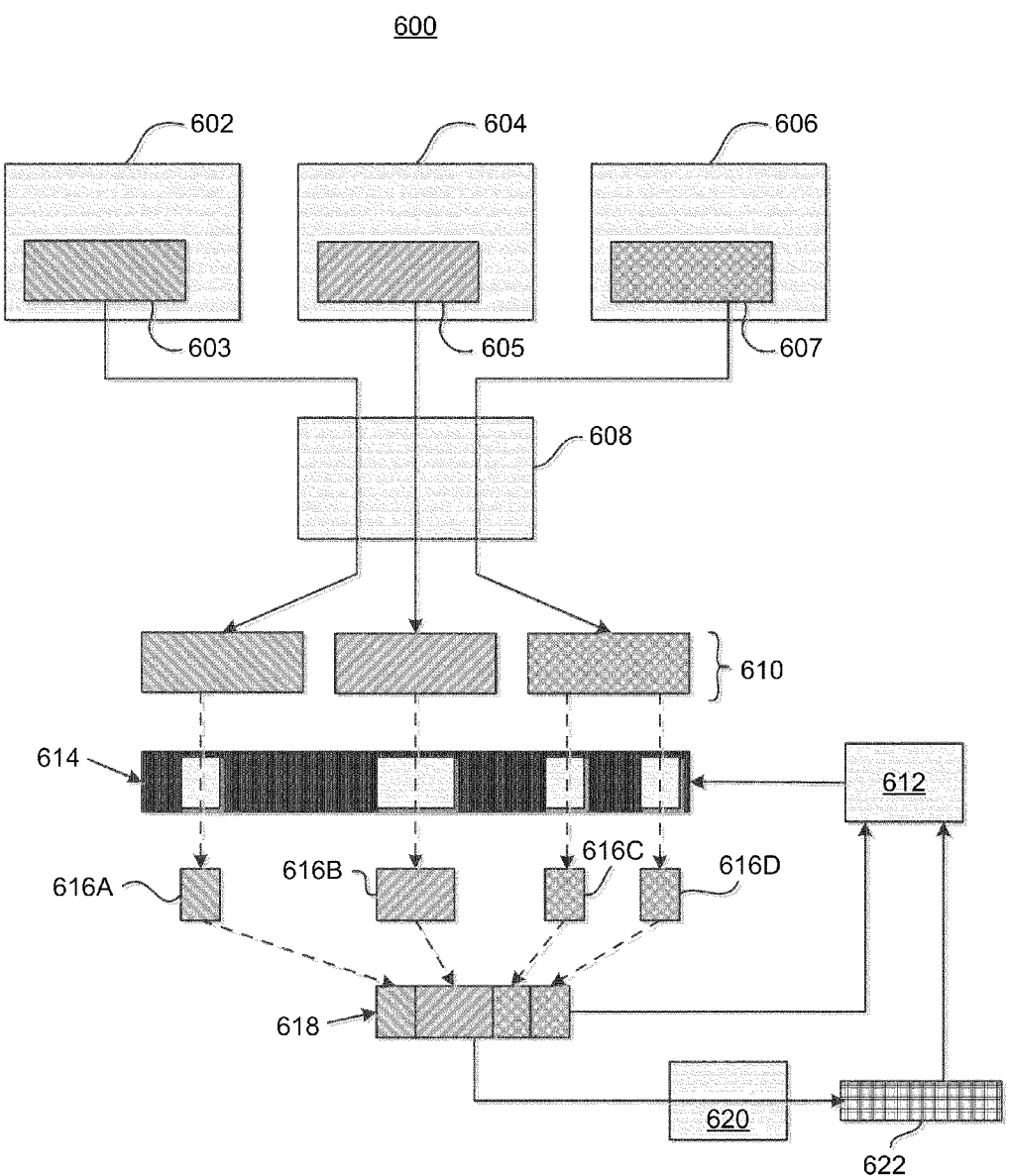
FIG. 6 is a diagram of one embodiment of the invention showing illustrative data elements used in generating a fingerprint.

Pattern masking the gross fingerprint data to provide a fingerprint for transmission may provide an important feature for enhancing security of transmissions between a client and a server. FIG. 6 illustrates pattern masking 600 in the present context, using a conceptual diagram. Items 602, 604 and 606 represent components or modules of a client device that include non-user-configurable data 603, 605 and 607 concerning a stable state or configuration of client hardware or firmware. A client-side process, such as one integral to the target executable, reads the data items and compiles the data in some prearranged order to form a gross fingerprint data record 610, including the data items 603, 605 and 607 stored in defined data fields. Although only three components and data items are illustrated, in most applications many more components and data items can and should be used to compile the gross fingerprint data.

A remote process 612, such as a process operating on a server, provides a pattern mask 614 to the client device. The pattern mask specifies defined portions 616A, 616B, 616C, and/or 616D of a data record that are to be used to compile a second fingerprint to be transmitted from the client device. Four data portions are illustrated by way of example only; any desired number of portions may be used and the portions may be selected with some overlap (no overlap is shown). In total, the data portions should identify substantially less than all of the data in gross fingerprint 610 for inclusion in the to-be-transmitted fingerprint, for example, less than 90%, or between 1% and 90%. Percentages outside of this range may also be used, but using too low of a percentage may be relatively inefficient, while using too high of a percentage may be relatively less secure. The pattern mask may also indicate an order with which the defined portions 616A, 616B, 616C, and/or 616D should be compiled to create the second fingerprint to be transmitted, or any other desired reversible data transformation.

A client-side process such as the target executable may then extract the defined data portions 616A, 616B, 616C, and/or 616D and compile them to provide a machine fingerprint 618. Optionally, the client device may delete the gross fingerprint 61 after the machine fingerprint 618 is defined. Although FIG. 6 shows the machine fingerprint as including data in delimited fields, this is merely for illustrative purposes. Generally, the client device should prepare the machine fingerprint as an unbroken field or data stream made up of the component items 616A, 616B, 616C, and/or 616D, formatted such that it is difficult or impossible for a third party not in possession of the pattern mask template 614 to determine where one data item ends and the next begins.

The client device may transmit the machine fingerprint 618 to the remote process 612 in an unencrypted form. In the alternative, a client-side encryption process 620 may encrypt the machine fingerprint 618 using any suitable encryption process to provide an encrypted fingerprint 622. The client device may transmit the encrypted fingerprint to the server.

Characteristically, therefore, the machine fingerprint 618 and template 614 cannot be used to reconstruct the gross fingerprint 610. In some embodiments, the gross fingerprint can be determined only by operating the described process at the client device on which the target executable is installed, is not stored, and is deleted from temporary memory after use. In other embodiments, the gross fingerprint may be securely transmitted to a trusted server and/or stored locally.

The machine fingerprint 618 may be used in a reverse authentication process used to authenticate the server to the client device. In this process, the server transmits a reverse key to the client device that is made up of data from the machine key 618, or the gross fingerprint 610 if shared with the server. In some embodiments, the reverse key is made up of the data items 616A, 616B, and/or 616C, 616D transformed or reordered according to a predefined template or plan that is programmed into the target executable on the client device. The client device may thereby determine whether or not the reverse key from the server is consistent with the gross fingerprint data 610 and the original masking template 614. For example, the client device may regenerate or retrieve from memory the machine key 618 generated using the template 614 and compare it to a machine key generated by applying a predetermined transformation to the reverse key from the server. If the keys match, the client device may deem the server authenticated and conversely if the keys do not match deem the server not authenticated. In the alternative, or in addition, the server may generate a second machine fingerprint using a new masking template and a gross fingerprint stored in memory. The server then transmits the second machine fingerprint and new masking template to the client device. In response, the client device may compare the second machine fingerprint to a newly-generated fingerprint generated at the client using the new masking template and the gross fingerprint data. If the fingerprints match, the client device may deem the server authenticated, and conversely, if the fingerprints do not match the client may deem the server not authenticated.

In accordance with the foregoing, FIG. 7 shows a method 700 that may be performed on a client device to generate a machine fingerprint to be transmitted to another device or process. Method 700 may be used in the processes discussed above to generate a machine fingerprint. At 702, the client may read the component data as discussed above. At 704, the client generates a gross fingerprint or data matrix comprising the component data in defined fields. At 706, the client may receive a defined selection mask or template from another device or process. At 708, the client may apply the received template to select data elements from the data matrix as discussed above. At 710, the client may aggregate the selected data elements to form fingerprint data capable of indentifying the client by stable elements of its hardware/firmware configuration. At 712, the client may encrypt the fingerprint for secure transmission. At 714, the client may output the fingerprint for use by another device or process to identify or authenticate the client device.

Also in accordance with the foregoing, FIG. 8 shows a method 800 that may be performed by a server or process to use a selection mask or template to authenticate or identify another device or process. At 802, the server may generate a selection mask with reference to a predefined data element or matrix. The predefined data element does not define the data itself, and instead defines a data structure in which the data will appear, for example, a structure of a database record. The selection mask should be generated to have the characteristics described above in the specification. The server may maintain the selection mask 804 in a database or memory accessible to the server for any desired length of time.

In response to any desired trigger, for example, a client request, the server may transmit the selection mask 806 to the target client. The target client is the client device to be identified or authenticated. After transmission, server may wait for the client to process the selection mask and then receive a data item 808 from the client identified as being the fingerprint data generated using the transmitted mask. If necessary, the server may decrypt 810 the fingerprint data received from the client.

At 812, the server may determine whether or not the fingerprint data is valid. Validity may be determined by the server based on comparison to a benchmark. In an identification process, the server may determine the fingerprint is valid if it conforms to an anticipated data structure, for example, if it is made up of the expected amount and form of data. In an authentication process, the server may determine the fingerprint is valid if it matches or is consistent with an earlier fingerprint received from the same client (or from a client purporting to be the same client). If the server does not determine that the fingerprint is valid, it may perform any desired failure routine, for example generating a failure signal 814. If the fingerprint is valid, it may be saved as an identifier of the client 816. In the alternative, or in addition, the server may use it to authenticate that a client is the same as one previously identified. At 818, the server may provide a confirmation signal confirming a successful authentication or identification of the client device.

It is noted that one or more of the techniques and methodologies described herein may be performed by embedded applications, platforms, or systems. For example, the techniques implemented by the static network device described herein may alternatively, or additionally, be performed by applications or components that are embedded in a portable devices, such as, for example, mobile phones, digital watches, personal or digital assistants (PDAs). It is further noted that the methods described herein may be performed by a general-purpose computer system and/or an embedded application or component of a special-purpose system.

In one embodiment, the special-purpose device comprises an embedded platform running an embedded Linux operating system (OS) or the like. For example, the unique device identifier or fingerprint for the special-purpose device may be created by collecting and using one or more of the following information: machine model; processor model; processor details; processor speed; memory model; memory total; network model of each Ethernet interface; network MAC address of each Ethernet interface; BlackBox model (e.g., any Flash device); BlackBox serial (e.g., using Dallas Silicone Serial DS-2401 chipset or the like); OS install date; nonce value; nonce time of day; and any other predefined hardware information stored (optionally encrypted) in EEPROM; any variations/combinations thereof.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disc (CD), digital versatile disc (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A method, at one or more servers, for selectively allowing participation in an auction, comprising:
    receiving, by the one or more servers from a first client device, a gross fingerprint, the gross fingerprint being generated based on fingerprint data that is characteristic of hardware or firmware belonging to the first client device, the gross fingerprint being generated to have a high probability of being unique to that specific client device;
    storing, by the one or more servers, the received gross fingerprint in a registry accessible to said one or more servers;
    receiving, by the one or more servers, a request from the first client device to participate in the auction;
    in response to receiving the request, transmitting, by the one or more servers, a time-varying sample-defining mask to the first client device, the sample-defining mask designating a sample of the fingerprint data that was used in compilation of the gross fingerprint for the first client device;
    receiving by the one or more servers from the first client device, a working machine fingerprint generated from the sample of the fingerprint data, wherein the working machine fingerprint is generated using an irreversible function of the fingerprint data and the time-varying sample-defining mask;
    comparing, by the one or more servers, the received working machine fingerprint with the stored gross machine fingerprint; and
    in response to the comparing, determining that the first device is authentic;
    in response to determining that the first device is authentic, determining if the received working machine fingerprint is not associated with data indicating the first client device did not satisfactorily complete a prior auction;
    in response to determining that the first client device is not associated with data indicating the first client device did not satisfactorily complete a prior auction, allowing participation of the first client device in the auction.

2. The method of claim 1, further comprising decrypting the received working machine fingerprint.

3. The method of claim 2, wherein decrypting comprises using an asymmetrical public-private encryption method using a private key for encryption and a public key for decryption.

4. The method of claim 1, wherein the steps are performed by one server.

5. The method of claim 1, wherein the stored gross machine fingerprint is associated with data providing an indication regarding whether a prior auction has been satisfactorily completed.

6. The method of claim 5, wherein the indication regarding whether a prior auction has been satisfactorily completed is a quantized indication.

7. The method of claim 5, wherein the data providing an indication regarding whether a prior auction has been satisfactorily completed may be modified.

8. The method of claim 7, further comprising transmitting the data providing an indication regarding whether a prior auction has been satisfactorily completed.

9. The method of claim 7, further comprising transmitting the data providing an indication regarding whether a prior auction has been satisfactorily completed when such data has been modified.

10. The method of claim 1, further comprising the one or more servers retrieving the sample-defining mask from memory.

11. The method of claim 10, wherein the retrieved sample-defining mask has a predetermined data structure.

12. The method of claim 1, further comprising the one or more servers generating the sample-defining mask.

* * * * *